Figure 1:
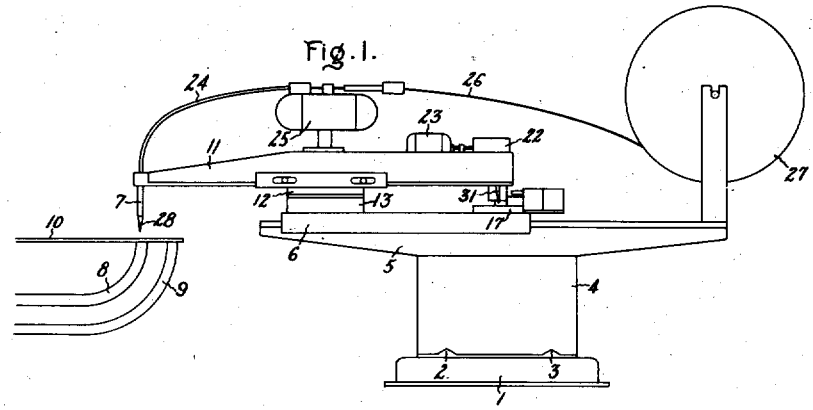

Feb. 11, 1936.  J. A. DORRAT  2,030,689

WELDING APPARATUS

Filed July 31, 1933  4 Sheets-Sheet 1

Inventor:
James A. Dorrat,
by Harry E. Dunham
His Attorney.

Inventor:
James A. Dorrat,
by Harry E. Dunbar
His Attorney.

Feb. 11, 1936.                J. A. DORRAT                    2,030,689
                           WELDING APPARATUS
                         Filed July 31, 1933            4 Sheets-Sheet 3
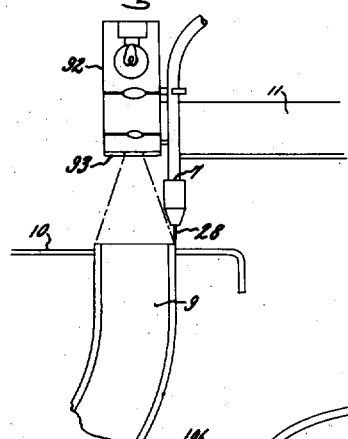
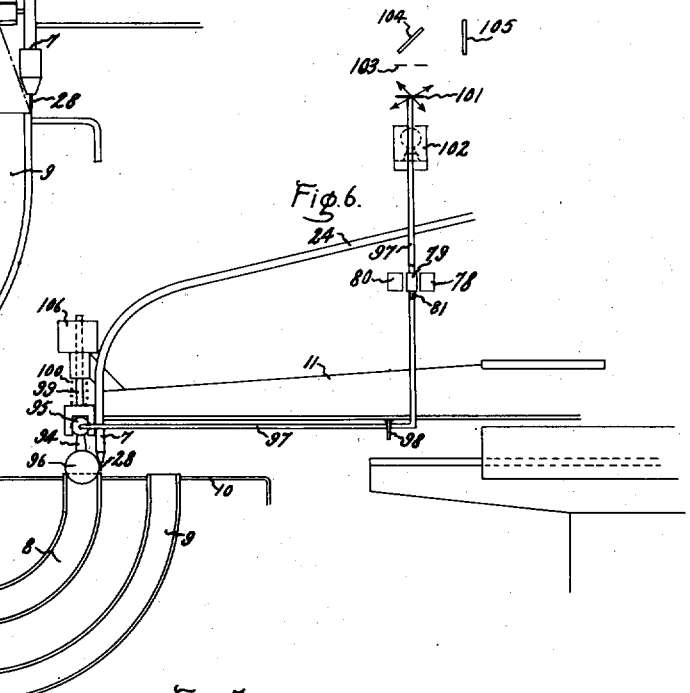
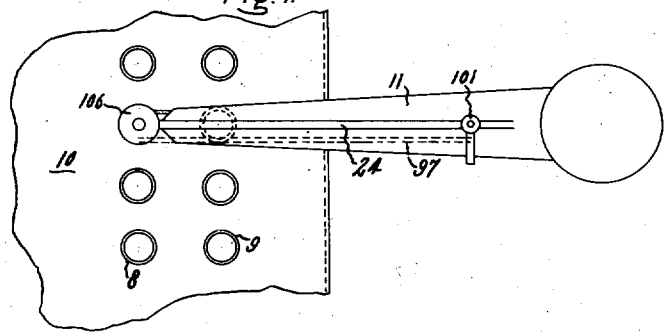
Inventor:
James A. Dorrat,
by Harry E. Dunham
His Attorney.

Feb. 11, 1936.    J. A. DORRAT    2,030,689
WELDING APPARATUS
Filed July 31, 1933    4 Sheets-Sheet 4
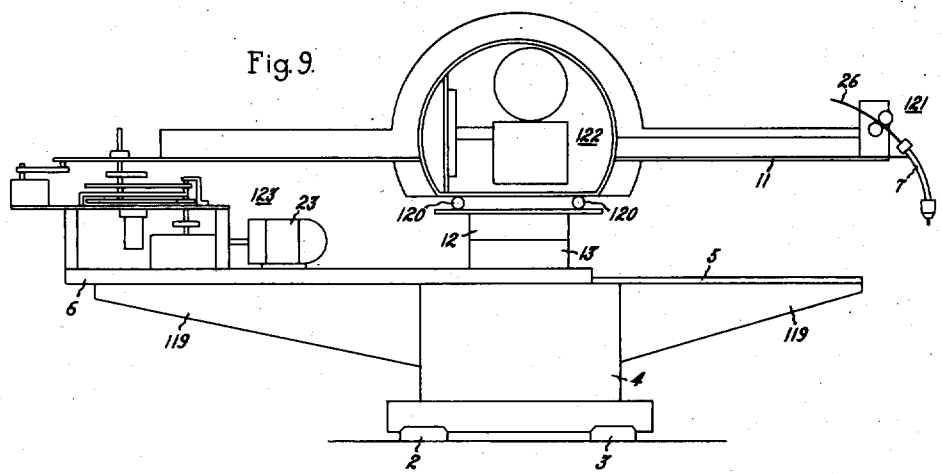
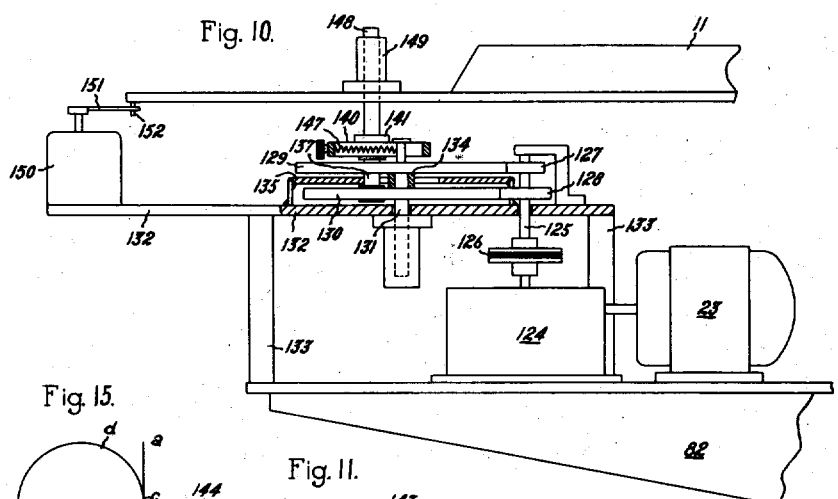
Inventor:
James A. Dorrat,
by Harry E. Dunham
His Attorney.

Patented Feb. 11, 1936

2,030,689

UNITED STATES PATENT OFFICE 2,030,689

WELDING APPARATUS

James Andrew Dorrat, Manchester, England, assignor to General Electric Company, a corporation of New York Application July 31, 1933, Serial No. 683,092
In Great Britain August 11, 1932

12 Claims. (Cl. 219—8)

My invention relates to welding apparatus of the kind in which a welding head carrying the agency by means of which a weld is made is moved automatically along a predetermined path corresponding to the joint which is to be welded. The welding agency may be of any suitable type, such for example as a metallic electric arc, a carbon arc, a gas flame, or the like.

It is an object of my invention to provide means for traversing the welding agency more than one complete revolution around a closed path so that the end of the weld extends a predetermined distance past its point of commencement.

It is a further object of my invention to provide means for initiating and terminating the movement of said agency around a closed path at a predetermined point or at predetermined points in its path of travel.

It is a further object of my invention to provide means for indicating when the welding agency is positioned over the work so that its predetermined path of travel which corresponds to the joint to be welded is properly located relatively thereto.

It is a further object of my invention to provide means for automatically locating the welding agency over the work with its path of travel corresponding to the joint to be welded.

Further objects of my invention will become apparent from a consideration of the following description of the embodiments thereof illustrated in the drawings.

Figure 2:
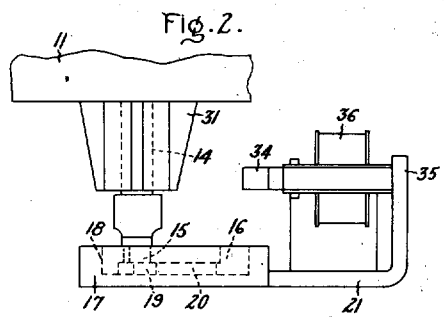
Figure 3:
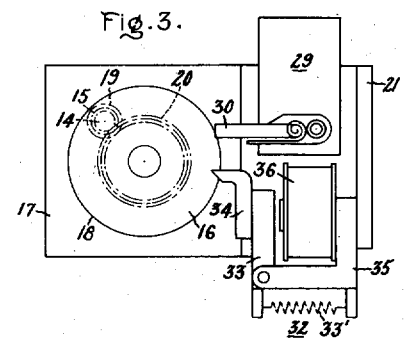

Fig. 1 of the drawings is a diagrammatic side elevation of one embodiment adapted for welding the ends of tubes in perforations in a plate member, such as a side of a transformer plate, by means of a metallic arc and Figs. 2 and 3 show a side elevation and a plan view respectively of a detail of the machine shown in Fig. 1.

Figure 4:
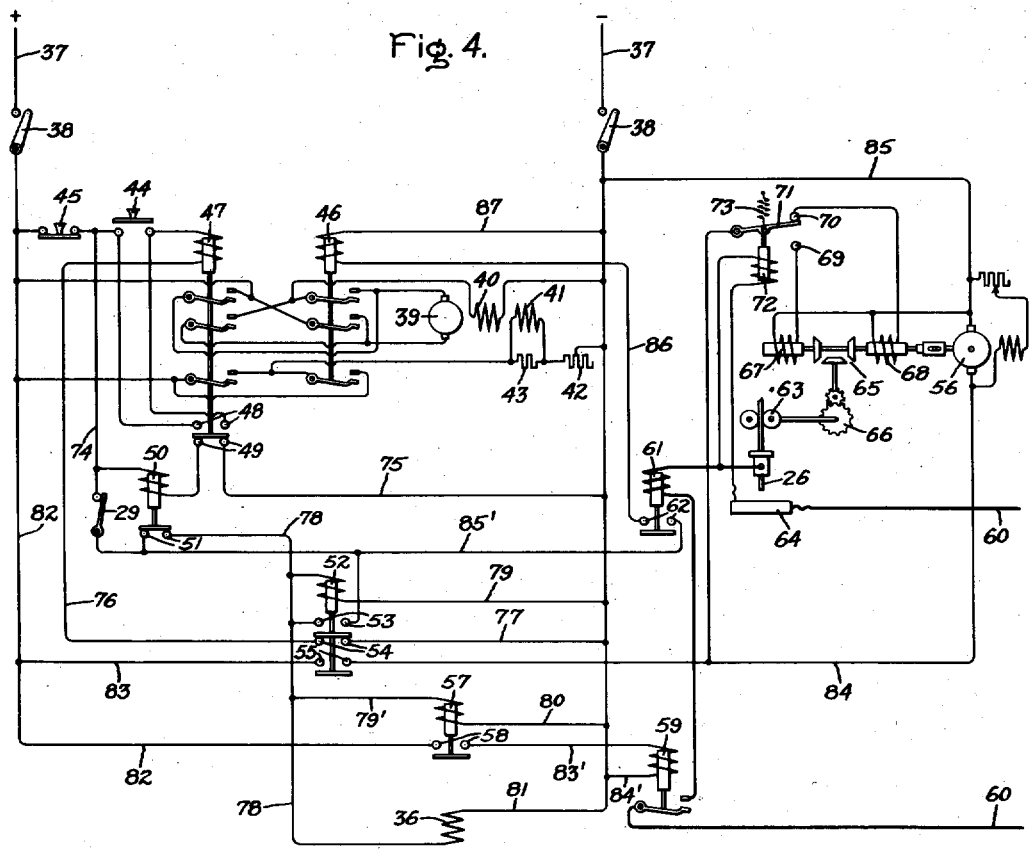

Fig. 4 of the drawings is a wiring diagram showing a control circuit for the machine illustrated in Figs. 1, 2, and 3.

Fig. 5 of the drawings is a part sectional side elevation of one form of positioning means which is adapted to be used in accordance with my invention with the machine shown in Figs. 1, 2, and 3.

Figs. 6 and 7 of the drawings illustrate another form of a positioning means adapted to be used with the machine illustrated in Figs. 1, 2, and 3, and Fig. 8 illustrates diagrammatically the control circuits including the electrical contacts illustrated in Fig 6 by means of which the welding head is automatically located over the work with its path of travel corresponding to the joint to be welded.

Fig. 9 of the drawings shows diagrammatically a side elevation of a second embodiment of my invention. Fig. 10 is a part sectional side elevation of a part of the machine of Fig. 9, and Figs. 11, 12, 13, and 14 are plan views of certain details of the machine of Fig. 9.

Figure 16:
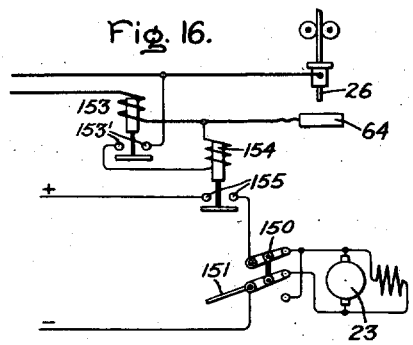

Fig. 15 of the drawings is a diagram used for explaining the action of the machine of Figs. 9 to 14 inclusive and Fig. 16 is a wiring diagram illustrating the connection of the limit switch 13 of this machine.

Referring first to Fig. 1, the welding machine therein shown comprises a bed plate 1 having machined longitudinal slides 2, 3 extending in a plane at right angles to that of the drawing and upon which a carriage 4 is slidably mounted. Said carriage supports by means of a pair of runners, one of which is visible at 5, extending perpendicularly to said slides 2 and 3, a further carriage 6 upon which is mounted the welding head, shown as an electrode nozzle 7, and means (to be described hereinafter) for causing said head to follow a circular path corresponding substantially to the cross-section of the cooling tubes, two of which are seen at 8 and 9, in the transformer tank side at 10. The mounting of the two carriages 4 and 6 for movement on their respective slides 2, 3 and runners 5 perpendicularly to one another, enables the welding head to be adjusted in position over the work 8, 9, 10. The welding head is attached to one end of an arm 11 which is slidably arranged on a member 12 pivotally mounted on a raised portion 13 of the carriage 6 so as to swing in a horizontal plane. As will be seen the end of arm 11 extends outwardly from the main part of the machine, with the metallic arc electrode projecting downwardly through the nozzle 7 so that the work 8, 9, 10 on which a joint is to be welded may be set up in front of the machine with the surface on which the joint lies facing upwardly as shown. The inner end of arm 11 is provided with bearings in which is mounted a vertical shaft, the lower part of which is indicated at 14 in Figs. 2 and 3. The lower end of this shaft carries a pinion wheel 15 meshing with a gear 16 fixed in a member 17, which is secured to the carriage 6. As shown said member 17 is formed with a circular recess 18 the cylindrical surface of which constitutes a cam surface corresponding to the shape of the gear 16 and with which a roller 19 mounted on the shaft 14 is adapted to engage. A cam surface 20 is arranged below the gear 16 and also engages with the roller 19. By the construction just above described, the pinion 15 is maintained correctly in mesh with the gear 16. The member 17 is formed with an extension 21 upon which are mounted certain devices as referred to hereinafter. The member 17 with said devices thus comprises a unitary construction adapted to be secured in place on the carriage 6.

The shaft 14 is connected through suitable reduction gearing, located in the casing 22, with an electric motor 23 carried by the arm 11. The above described arrangement constitutes a pantograph in which the motion imparted to the inner end of the arm 11 by rotation of the pinion 15 around the gear 16 is reproduced in the opposite direction by the other end of said arm, namely, that carrying the electrode nozzle 7. In such a copying device, the reproduced figure is not exactly similar to the original (in this case the gear path) since during operation, the distances between the point about which the arm pivots and its two ends are changing in opposite directions, but since the size of the figure in the machine being described is small compared with said distances, such discrepancy may be ignored. For making circular joints, therefore, said gear 16 may be circular, or in an alternative arrangement the motor 23 may be arranged on the carriage 6 and fixed thereto, and driving a crank, the crank-pin of which is connected with the inner end of the arm 11. Such modified arrangement has the advantages of eliminating the necessity both of carrying the motor on the moving arm and of employing flexible leads to carry the current to said motor, whilst the drive arrangement can be made more substantial.

The welding head in the machine actually being described comprises the nozzle 7 attached to the outer end of the arm 6 and projecting downwardly, the upper end of said nozzle 7 being in communication with a tube 24 leading to an electrode feeding mechanism 25 mounted on said arm. The welding electrode, consisting of a suitable wire 26, is drawn from a drum 27 rotatably supported from a convenient part of the machine, for example from the end of the runners 5 as shown. Said wire 26 passes through the said feeding mechanism 25, and thence by way of tube 24 and nozzle 7 to project into proximity to the work 8, 9, 10 so that an electric arc may be struck between the work and the projecting end 28 of said electrode wire 26.

The motor 23 which may be termed the travel motor is controlled by means of a limit switch device mounted on the extension 21 of the member 17 so that after being set in operation by actuation of suitable operating means, said motor will move the welding head through a complete circle and during successive actuations will always return to the same position. In accordance with the present invention, moreover, control means are provided, whereby upon actuation of an operating member to initiate a welding operation, the travel motor 23 before driving the welding head as above described, is energized so as to rotate in the reverse direction, so that an initial reverse movement of the welding head takes place. The welding head may for instance move in the reverse direction for about a quarter of an inch when welding tubes two inches in diameter. At the end of the reverse movement the travel motor is energized in the forward direction (clockwise in Fig. 3) and the welding head moved round the joint until its motion is stopped by the limit switch device. The limit switch is indicated generally at 29 and the operating member 30 thereof is adapted to be engaged by the depending boss portion 31 of the arm 11 in which boss portion is located the shaft 14. Said operating member 30 is so located that it is not passed by said boss 31 during the reverse movement of the arm 11 whereby said switch will not be operated until the end of the forward movement of said arm. A stop device 32, associated with the limit switch, is also mounted on the extension 21 of the member 17 and cooperates with the boss 31 positively to stop the latter and thereby the arm 11 in a predetermined position. Said stop device 32 comprises a pivotally mounted magnetic armature 33 to which is attached a detent member 34 forming the actual stop which engages with the boss 31. The device 32 further comprises a magnetic member 35, one limb of which is embraced by a coil 36 and to which the armature 33 is pivoted. Said armature is biased such as by means of a spring 33' away from the said limb of member 35 to the position shown in the figure. The stop 34 may thus be withdrawn from the path of the boss 31 at the beginning of the operation so that the forward movement of the welding head following the reverse movement of the latter is not affected, the coil 36 being energized to render the stop inoperative when the travel motor is energized in the forward direction. The limit switch 29 is opened as the boss 31 approaches the stop, to deenergize the travel motor 23 and the coil 36 of the stop device 32 so that the stop 34 will be projected into the path of the boss 31. Due to the momentum of the moving system, the movable arm 11 will continue to move until in contact with said stop. A friction clutch may be arranged between the motor 23 and the pinion 15 for the purpose of taking up any overrun of the travel motor 23.

The control means are arranged to cause the welding arc to be struck prior to the forward energization of the travel motor whereby the arc will deposit weld metal from the electrode 26 for more than a complete revolution, whilst returning at the end of the operation to its original position as determined by the stop 34.

The welding machine above described may be controlled by a circuit such as diagrammatically represented in Fig. 4 of the drawings.

In this figure the magnetic relays and switches have been illustrated in the positions they assume when deenergized. The control circuits are energized from a source of supply 37 through switches 38. The armature of the travel motor 23 as indicated at 39, its series field winding at 40 and its shunt field winding at 41. A regulating resistance for the field 41 and a discharge resistance connected in shunt thereto are indicated respectively at 42 and 43.

The operation of the system is initiated by a start push button 44 and may be interrupted by the operation of the stop push button 45. The connection of the armature 39 of the motor 23 to the source of supply 38 is controlled by a forward contactor 46 and a reverse contactor 47. These contactors also control the connection of the field 41 to the source of supply 37. The contactor 47 is provided with holding contacts 48 connected in shunt to the start push button contacts. This contactor also is provided with normally closed contacts 49 connected in the energizing circuit of relay 50. This relay is provided with contacts 51 which are closed when the relay is deenergized, thus completing the operating circuit for the relay 52. This relay is provided with holding contacts 53, contacts 54 in the operating circuit of the contactor 47 and contacts 55 in the circuit of the feed motor 56 of the welding head. The circuit through contacts 51 of relay 50 also controls the energization of the coil 36 of the stop device 32 and the energization of a relay 57 whose contacts 58 control the operation of a contactor 59 connected in the welding circuit 60. A relay 61 responsive to the welding circuit controls through its contacts 62 a circuit through the operating coil of the contactor 46. The switch 29 is the limit switch referred to in describing the machine of Figs. 1, 2 and 3. The feed motor referred to above is connected to the feed rolls 63 by means of a transmission 65 and a gear train 66. The transmission 65 comprises driving and driven members which are brought into engagement with one another through the agency of operating coils 67 and 68. These coils are energized through circuits including the fixed contacts 69 and 70 and a movable contact 71 of a relay 72 whose operating coil is connected across the welding arc. The movable contact 71 is biased into engagement with the fixed contact 70 by means of a spring 73.

The system illustrated in Fig. 4 will be better understood from a consideration of its operation which is as follows: Upon the closure of switches 38 the contacts 51 of relay 50 will be opened by reason of the energization of this relay through the following circuit: From the positive conductor of the source of supply 37 through switch 38, push button 45, conductor 74, operating coil of relay 50, contacts 49 of the contactor 47 and conductor 75 to the negative conductor of the source of supply 37. The operation of the machine is initiated by closing push button switch 44. The closure of this switch completes the operating circuit of contactor 47 through the following circuit: From the positive conductor of the source of supply 37 through switch 38, push buttons 45 and 44, conductor 76, contacts 54 of relay 52 and conductor 77 to the negative conductor of the source of supply 37. The operation of contactor 47 deenergizes the relay 50 by opening contacts 49 and establishes its holding circuit through contacts 48 which are shunted across the contacts of the push button switch 44. The deenergization of the relay 50 energizes through its contacts 51 relays 52 and 57 and the operating coil 36 of the stop device 32. Relay 50 may have a delayed closing characteristic in order to delay the opening of contactor 47 through the agency of relay 52 whose controlled circuits are described below. Relay 52 is energized through the following circuit: From the positive conductor of the source of supply 37 through switch 38, push button 45, conductor 74, normally closed limit switch 29, contacts 51 of relay 50, conductor 78, the operating coil of relay 52 and conductor 79 to the negative conductor of the source of supply 37. Relay 57 is operated through the following circuit: From the positive conductor of the source of supply 37 through switch 38, push button 45, conductor 74, normally closed limit switch 29, contacts 51 of relay 50, conductors 78 and 79' of operating coil of relay 57, and conductor 80 to the negative conductor of the source of supply 37. The operating coil 36 of the stop device 32 is energized through the following circuit: From the positive conductor of the source of supply 37 through switch 38, push button 45, conductor 74, limit switch 29, contacts 51 and conductors 78 and 81 to the negative conductor of the source of supply 37. The operation of relay 52 completes a holding circuit for itself, relay 57 and coil 36 of the stop device through contacts 53 which are connected in shunt to the contacts 51 of relay 50, deenergizes the contactor 47 by opening contacts 54, and completes the operating circuit of the feed motor 56 as follows: From the positive conductor of the source of supply 37 through switch 38, conductors 82 and 83, contacts 55 of relay 52, conductor 84, motor 56 and conductor 85 to the negative conductor of the source of supply 37. The energization of relay 57 completes the operating circuit of contactor 59 as follows: From the positive conductor of the source of supply 37 through switch 38, conductor 82, contacts 58 of relay 57, conductor 83', the operating coil of contactor 59 and conductor 84' to the negative conductor of the source of supply 37. The operation of contactor 59 completes the connection of the welding circuit 60 to the electrode 26 and work 64.

Assuming that the electrode 26 is separated from the work 64 the operating coil of the relay 72 connected across the electrode and the work will be energized sufficiently to move its contact 71 into engagement with its contact 69 thereby energizing coil 67 of the transmission 65 by means of which a driving connection is established between the feed motor 56 and the feed rolls 63 in a direction to feed the electrode 26 toward the work 64. As soon as the electrode engages the work, the flow of welding current energizes relay 61 which thereupon closes its contacts 62, completing an operating circuit for the forward contactor 46 as follows: From the positive conductor of the source of supply 37 through switch 38, push button 45, conductor 74, limit switch 29, conductor 85', contacts 62 of relay 61, conductor 86, the operating coil of contactor 46 and conductor 87 to the negative conductor of the source of supply 37. The operation of contactor 46 reverses the connections of the armature 39 of the travel motor 23 which thereupon operates to traverse the welding arc around its predetermined path of movement until the depending boss 31 of the machine referred to in Figs. 1, 2, and 3 engages and operates the limit switch 29. As soon as the electrode 26 engages the work 64, the relay 72 is deenergized and its contact 71 is moved into engagement with its contact 70 by spring 73, thereby completing the energization of operating coil 68 of the transmission 65 by means of which a driving connection is established for feeding the electrode 26 away from the work 64. This strikes an arc which is thereafter maintained by the joint operation of the relay 72 and the transmission 65. The operation of limit switch 29 deenergizes relays 52 and 57 as well as the operating coil 36 of the stop device 32. The deenergization of the relay 52 interrupts the operation of the feed motor 56 and the deenergization of the relay 57 interrupts the welding circuit by deenergizing the contactor 59 whose contacts are located in the welding circuit.

It will be seen that with the machine above described the welding head is automatically moved twice over the point of commencement of the joint whilst welding, and returned to the same relative position at the end of each weld. It is thus insured that the joint is completely welded, whilst the positioning of the movable carriages 4 and 6 of the machine when moving from one joint to another is greatly facilitated due to the fact that during such positioning the arc electrode 26 always occupies a predetermined and corresponding point on each joint.

It will be appreciated that in carrying into effect the embodiment of the invention above described, the reverse movement is not necessarily imparted to the welding head at the commencement of the operation, but may be arranged to occur at the end of the operation, after the arc has moved more than once around the joint.

Figs. 5, 6, 7, and 8 relate to means, which according to the further feature of the invention, are provided on the machine for positioning or setting the welding head over the work so that the weld will be correctly located. In the form of such positioning means shown in Fig. 5 the lamp 92 is supported on the outer end of the movable arm 11 in proximity to the electrode nozzle 7 so as to project a patch of light on the surface of the work, for example the plate 10 and tube 9. Means such as a mask 93 are incorporated with the lamp whereby as indicated by the dotted lines said patch of light is of substantially similar shape and size to the cross-section of the tube 9 to be welded, the arrangement being such that when the machine has been adjusted so that the fringe of the light patch coincides with the end of said tube, the electrode end 28 will be correctly positioned over the point at which the weld is to be commenced and the circular movement of said nozzle 7 will coincide with the joint which is to be welded.

With the above described setting device, it is necessary for the operator of the machine to view the upper face of the work from a position above the welding head in order that he may properly observe the patch of light, which necessity requires, in the case of welding tube plates, the operator climbing into the transformer tank, with the result that an undesirable length of time is required for the setting up operation. In order to obviate this objection an indicator may be arranged so as to give an indication which can be observed from the control position of the machine.

In one form of such indicator, illustrated in Figs. 6 and 7, a short arm 94 is universally mounted by its end 95 upon the movable arm 11 of the machine in place of the lamp above described with reference to Fig. 5. The end 95 of the lever 94 is ball-shaped and suitably supported in bearings to permit the lever to have a universal movement about its point of support. The other end of said short arm is formed as a ball 96, hereinafter referred to as the registered ball, of slightly larger diameter than the bore of the tubes 8, 9 which are to be welded, whilst there is fixed to said arm 94 at its point of universal mounting an L-shaped member 97. This member constitutes an index arm, one end of which is supported in the end 95 of lever 94. The connection is such that lever 94 may turn about the axis of index member 97 attached thereto or may bodily move this member in a vertical plane. A vertical guide 98 carried by the arm 11 prevents movement of the right-hand end of the horizontal limb of the L-shaped member other than in the vertical plane. As will be seen, the limbs of the L-shaped member 97 are of greater length than said ball-ended arm 94, in the example shown about eight times, so that movement of the latter causes a correspondingly larger movement of the former.

The ball-ended arm 94 is carried on a vertical rod 99 slidably mounted on the arm 11 of the machine, adjacent the electrode nozzle 7. Spring means 100 shown in section in Fig. 6 are arranged to bias said rod 99 downwardly, whereby the registering ball 96 is adapted to be pressed tightly into a tube such as 8 to be welded. The upper end of the vertical limb of the member 97 carries a perforated mask 102 arranged on one side of a disc 101 and a second perforated disc 103 is disposed on the other side of disc 101. The arrangement also includes a mirror 104 and a screen 105 so that when the perforations in said two discs 101 and 103 and said mask are in line, a beam of light from the lamp 102 will be projected on to said screen 105. The lamp 102 and disc 103, mirror 104 and screen 105 are all mounted on the arm 11 and arranged so that the light appears on the screen 105 from the lamp 102 only when the registering ball 96 is in line with and the correct distance from the welding electrode 28. Such lamp 102 and disc 103, mirror 104 and screen 105 are, for the sake of clearness, omitted from Fig. 7. It is necessary to withdraw the registering ball 96 from the tube before the welding operation is commenced, and to this end a solenoid 106 is arranged when energized to lift the rod 99 to which the arm 94 is universally attached.

It will be seen that with the arrangement just above described it is unnecessary for the operator to be above the welding head to view the joint to be welded when setting the machine, since the actual indicator, namely the screen 105 can be disposed conveniently for observation from the control position of the machine.

Figure 8:
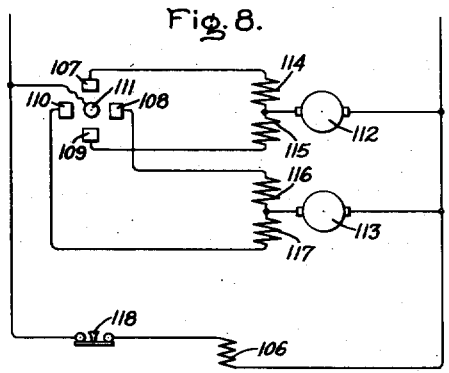

Automatic positioning of the welding head may be obtained by employing four electrical contact members carried by the arm 11 and disposed in a horizontal plane around a contact carried by the vertical limb of the L-shaped member or index 97. Figs. 6 and 8 show diagrammatically the arrangement of such contacts, the four contact members 107, 108, 109, and 110 being disposed around the contact 111 on the member 97 as shown. Said contacts are arranged so that when the welding head is in the correct position with regard to the tube to be welded, the contact 111 is equidistant from all four of said contacts 107, 108, 109, and 110 but when the welding head is not so positioned contact 111 will be moved into contact with one or other of said four contacts in accordance with the direction in which the welding head has to be moved to bring it into the correct position. The contacts 107, 108, 109, and 110 are connected with control circuits for two electric motors 112 and 113 adapted to cause movement of the carriages 4 and 6 respectively of the machine. Motor 112 is provided with fields 114 and 115 and motor 113 is provided with fields 116 and 117. The construction of these motors is such that when operating circuits are completed through fields 114 and 116 they rotate in one direction, and when circuits are completed through fields 115 and 117 they rotate in the opposite direction. Thus when the welding head requires adjustment in a longitudinal direction the contact 111 will engage with one or the other of contacts 107 or 109 and the motor 112 will impart the required longitudinal movement in one direction or the other to the carriage 4. Should the welding head require transverse adjustment, the contact 111 will make contact with one or the other of contacts 108 or 110 and the motor 113 will impart the required transverse movement to the carriage 6. The contacts 107, 108, 109, and 110 are flexibly supported on the arm 11 in order to take up the relatively large setting errors which occur as the head is approximately positioned above the tube. An alternative arrangement in which the movable contact 111 is thus flexibly mounted may be provided in which case it would not be necessary to flexibly support contacts 107, 108, 109, and 110.

In the operation of the machine with the positioning device just above described, the operator will set the welding head approximately over the tube to be welded and will then press the start push-button 118, the electrical control circuits of the machine being arranged so that such actuation of the start push-button allows the registering ball 96 to drop into the tube above which it is approximately located, whereby the welding head will be automatically adjusted into the correct position with regard to the said tube, as described above, after which adjustment the registering ball 96 is withdrawn from the tube and the weld commenced in the manner previously herein described. When the weld is completed, the operator moves the welding head approximately into position above the next tube to be welded, when actuation of the start push-button will result in the above automatic sequence of operations being repeated upon said next tube.

Referring now to Fig. 9 the machine therein illustrated is similar to that of Fig. 1, but a modified form of mechanism for causing the desired movement of the welding head is employed, such mechanism being described more particularly with reference to Figs. 10, 11, 12, 13, and 14. In the machine of Fig. 9, the electrode is caused to pass twice over the point of commencement or finish of the weld on the actual joint whilst depositing weld metal by giving to the electrode nozzle 7 the motion represented in Fig. 15. With this arrangement, the welding arc is established away from the actual joint to be welded, so that good fusion is obtained when the arc moves over said joint. Thus, the welding operation starts alternately from the points a and b (Fig. 15) during successive welding operations, the point at which the arc commences to deposit weld metal to the actual joint being c. The welding electrode travels along the straight path from a to c or b to c, then travels round the circular portion d corresponding to the tube end to be welded, and then passes again over the point c finally to travel along the straight portion c to b or c to a, respectively. It will be seen that the arc moves twice over the point c which is the point at which the welding of the actual joint is commenced and finished, whilst depositing weld metal. With this machine, furthermore, the head only requires to move in a single direction for each operation since it starts alternately from the points a and b. It will be seen that setting of the head with regard to the tubes to be welded is a simple matter, since the head always starts from one or other of two points predetermined with respect to the joint, which points are the same during alternate welds.

The machine shown in Fig. 9 is similar to that of Fig. 1, in that it comprises slides 2 and 3 on which a carriage 4 is mounted, said carriage having runners 5 extending over cantilevered portions 119, whilst a second carriage 6 is mounted on said runners 5. The arm 11 is mounted for translational movement on the portion 12 by means of rollers 120, the portion 12 being mounted so as to swivel on the part 13 of the carriage 6. The electrode nozzle 7 is mounted on the right-hand end of the arm 11 together with a mechanism, indicated diagrammatically at 121 for feeding the electrode wire, part of which is shown at 26. The mechanism 121 is driven from any suitable mechanism which together with a bobbin or spool carrying the electrode wire 26 is located in the center of the arm 11 as indicated diagrammatically at 122. The electrode wire 26 is not shown between the mechanism 122 and the feed mechanism 121. The mechanism for causing the required movement of the arm 11 is mounted on the carriage 6 and is indicated generally at 123 in Fig. 9 and is shown in detail in Fig. 10. Said mechanism 123 will now be described with reference to Figs. 10, 11, 12, 13, and 14. Referring to Fig. 10, the travel motor 23 is mounted on the carriage 6 and drives through a suitable reduction gear 124 a vertical shaft 125 formed in two parts with a clutch 126 inserted between said two parts for the purpose described with reference to Fig. 1. Said shaft carries pinions 127 and 128 gearing respectively with gear wheels 129 and 130 which are mounted respectively loosely and fast on a shaft 131 journalled from a deck plate or table 132 which is supported on the carriage 6 by means of pillars such as 133. The relative sizes of the pinions 127 and 128 and gear wheels 129 and 130 are such that for a given angular movement of shaft 125 the gear wheel 130 is rotated further than the gear wheel 129. The gear wheels 129 and 130 are spaced from one another by means of a spacing washer 134 and a plate 135 which may be termed a cam plate, is located between said gear wheels, said cam plate being fixed to and supported from the table 132. The cam plate 135 is provided with a central perforation 136 (see more particularly Fig. 13) forming the cam surface. Cooperating with said cam surface is a pin 137 which is mounted on the gear wheel 130 so as to have imparted to it the angular movement of the latter. The engagement of the pin 137 with said gear wheel 130 is by means of the slot 138 (Fig. 12), whereby the pin 137 may move radially with respect to the shaft 131. The pin 137 extends through a slot 139 (Fig. 14) provided in the gear wheel 129 and carries at its upper end a frame member 140 (Figs. 10 and 11) which is provided with slides carrying a saddle 141, a screw-threaded lug 142 (Fig. 11) of which saddle is engaged by a screw-threaded shaft 143 rotationally mounted in the frame 140 and provided with a milled head 144. Rotation of head 144 will thus cause longitudinal movement of the saddle 141 with respect to the pin 137, for a purpose which is to be referred to hereinafter. The frame member 140 is provided with a slot through which the rectangularly formed end 146 of the shaft 131 extends. A compression spring 147 engages with the end of the shaft 131 and with the frame member 140 to force said frame member and thereby the pin 137 radially outwards from said shaft 131. The saddle 141 has attached to it a post 148 which engages with a boss member 149 secured to the arm 11, whereby motion of the saddle 141 will be transmitted to said arm 11. A limit switch device 150 is mounted on the table 132, the operating member 151 of which is adapted to be engaged by a projection 152 of the arm 11 to operate electrical circuits in a manner to be described hereinafter.

In the operation of the mechanism shown in Figs. 10, 11, 12, 13, and 14, rotation of the shaft 125 from the motor 23 causes rotation of the gear wheels 129 and 130 at differing speeds. The gear wheel 130 drives through the slot 138 (Fig. 12) the pin 137, which is forced against the cam surface of the perforation 136 in the cam plate 135 by the spring 147 (Figs. 10 and 11), to cause the required movement of the arm 11. Thus, considering the start of a welding operation, the pin 137 will occupy a position at *a* or at *b* in Fig. 13 corresponding respectively to the point *a* or *b* of Fig. 15, whilst the arrangement is such that the end *a'* or *b'* of the slot 139 (Fig. 14) in the gear wheel 129 is located over the point *a* or *b* respectively of the cam perforation 136. Upon rotation of the shaft 125, the pin 137 will be moved along the path *a* to *c* or *b* to *c*, the shape of slot 139 being such that, having regard to the speed of wheel 129 in relation to the speed of wheel 130, the portions *a'* to *ca* and *b'* to *cb* intersect the intersection of the slot 138 with the line *a* to *c* or *b* to *c* respectively. When, however, the pin 137 arrives at the point *c* on the cam surface, corresponding to the point *c* of Fig. 15 it is necessary that said pin be guided tangentially off the line *ab* to the main curved portion of the cam surface. For this purpose the gear wheel 129 is provided, the shape of the slot 139 being such that the pin 137 will be guided on to the curved portion of the cam surface after passing the point *c* and after it has moved over said curved cam surface will be again guided by the slot 139 on a path forming a continuation of said curved surface and of the same radius, until the point *c* is again reached, when said pin 137 will be allowed to be forced against the straight portion of the cam surface and thus moved to the position *b* or *a* respectively.

By rotation of the milled head 144, the position of the post 148 with respect to the pin 137 may be adjusted, so that the size of the contour traced out at the welding nozzle can be altered without changing the cam plate 135 or the slotted gear wheel 129.

The control circuit for the machine just above described may be arranged so that actuation of a single control member such as a push-button, will cause energization of the travel motor 23 in the appropriate direction as determined by the contacts of the limit switch 150, the operating member 151 of which is thrown from one position to another when the pin 137 approaches the point *a* or the point *b* (Fig. 13), the circuit being arranged so that the travel motor will not be so energized until the electrode feed motor and mechanism has been set into operation, and the welding arc current has started. One arrangement is shown in Fig. 16 in which the electrode is shown at 26, the work at 64, the limit switch at 150, and the travel motor at 23. It will be noted that as soon as the welding current flows, the relay 153 will be energized, completing the operating circuit for relay 154 which is connected across the electrode 26 and the work 64 so that when the welding arc attains a predetermined length relay 154 will operate to complete the circuit of motor 23 through contacts 155.

It will be understood that various modifications of my invention are possible without departing therefrom. Thus by the employment of suitably-shaped cams it will be possible to weld non-circular seams as well as the circular seams for which the particular embodiments of my invention illustrated and described above are adapted. It will also be understood as initially pointed out that my invention is not limited to metallic arc welding, but is equally applicable to carbon arc welding, gas arc welding, and the like.

What I claim as new and desire to secure by Letters Patent of the United States is:

1. Welding apparatus comprising a welding agency, means for directing said welding agency along a predetermined closed path, and means for moving said welding agency more than one complete revolution in one direction about said path while welding and for moving said agency while not welding the distance greater than one revolution that said welding agency has traveled about said path during welding, said last mentioned movement occurring at one end of the welding movement and said moving means initiating and terminating its movement at a predetermined point in said path.

2. Welding apparatus comprising a welding agency, means for directing said welding agency along a predetermined closed path, means for moving said welding agency while welding more than one complete revolution around said path, means including a stop for bringing said welding agency to rest in a predetermined position, and means for rendering said stop inoperative during the first revolution of said welding agency around said path.

3. Welding apparatus comprising a pivot, a support for said pivot, an arm mounted on said pivot for lengthwise movement relative thereto, a welding head mounted on the outer end of said arm, a gear having a configuration similar to the required path of movement of said welding head, a second gear, means for rotating said second gear, means for maintaining said second gear in mesh with said first mentioned gear, means for supporting one of said gears on the inner end of said arm, and means for supporting the other of said gears on said support for said pivot.

4. Welding apparatus comprising a welding agency, means for directing said agency along a predetermined path, means including a motor for traversing said welding agency along said path, a stop in the path of movement of said welding agency, means including an electromagnet for moving when energized said stop from the path of movement of said welding agency, means for energizing said motor for one direction of rotation during forward travel of said welding agency more than one complete revolution about said path, means for energizing said electromagnet during said forward travel of said welding agency past said stop, means for energizing said welding agency during said forward travel thereof, and means for reversing said motor and for traversing said welding agency backwards the distance greater than one revolution that said welding agency has traveled around said path of movement during welding.

5. Welding apparatus comprising a welding agency, means for directing said welding agency along a predetermined path, means for adjustably positioning said welding agency and said directing means over the joint to be welded, and means for indicating when said welding agency is positioned over the work so that its predetermined path coincides with the joint to be welded.

6. Welding apparatus comprising a welding agency, means for directing said welding agency along a predetermined path on the work and means located relatively to said welding agency for projecting on the work when said welding agency is in operative position relative thereto a patch of light the fringe of which coincides with said path.

7. Welding apparatus comprising a welding agency, means for moving said welding agency in a predetermined path corresponding to the periphery of a perforation in a body, a lever having an end portion adapted to engage the periphery of said perforation, an index attached to said lever, and means for universally supporting said lever relatively to said welding agency with said index occupying a predetermined position when said predetermined path of movement of said welding agency coincides with the periphery of said perforation.

8. Welding apparatus comprising a welding agency, means for moving said welding agency in a circular path corresponding to the periphery of a perforation in a body, a lever terminating in a ball adapted to enter part way into said perforation, an index attached to said lever, and means for universally supporting said lever relatively to said welding agency with said index occupying a predetermined position when said circular path of movement of said welding agency coincides with the periphery of said perforation.

9. Welding apparatus comprising a welding agency, means for moving said welding agency in a circular path corresponding to the periphery of a perforation in a body, a lever terminating in a ball adapted to enter part way into said perforation, means for withdrawing said ball from said perforation and from the path of travel of said welding agency, an index attached to said lever, and means for universally supporting said lever relatively to said welding agency with said index occupying a predetermined position when said circular path of movement of said welding agency coincides with the periphery of said perforation.

10. Welding apparatus comprising a welding agency, means for moving said welding agency in a predetermined path corresponding to the periphery of a perforation in a body, a lever having an end portion adapted to engage the periphery of said perforation, means for universally mounting said lever in a predetermined position relative to said welding agency, a second lever rigidly attached to said first lever and having at its end portion means for projecting a beam of light on a screen only when said lever occupies a predetermined position in which said predetermined path of movement of said welding agency corresponds with the periphery of the perforation in said body.

11. Welding apparatus comprising a welding agency, means for guiding said welding agency along a predetermined path of travel, corresponding to the joint to be welded, means for adjustably positioning said welding agency and said guiding means over the work, and means engaging the work at the joint for operating said last mentioned means and automatically positioning said welding agency and said guiding means relatively to the work so that said predetermined path of movement of said welding agency coincides with the joint to be welded in the work.

12. Welding apparatus comprising a welding agency, means for directing said welding agency in a predetermined path corresponding to the periphery of a perforation in a body, a lever having an end portion adapted to engage the periphery of said perforation, an index attached to said lever, a contact attached to said index, cooperating contacts surrounding said index contact, means including electric motors for moving said welding agency and its directing means relatively to the work, and means including said contacts for selectively energizing said motors until said welding agency is positioned over the work with its path of travel corresponding to the joint to be welded in the work.

JAMES ANDREW DORRAT.